United States Patent [19]

Waggoner

[11] Patent Number: 4,500,385

[45] Date of Patent: Feb. 19, 1985

[54] LUMBER ASSEMBLY MACHINE

[76] Inventor: Dennis H. Waggoner, 11960 Forestwood Dr., Dallas, Tex. 75234

[21] Appl. No.: 597,712

[22] Filed: Apr. 6, 1984

[51] Int. Cl.[3] ..................... B32B 19/02; B32B 31/00; B31F 5/00; B65H 29/00

[52] U.S. Cl. ..................... 156/380.4; 156/380.2; 156/379.6; 156/381; 156/304.5; 156/556; 156/558; 156/567; 156/580; 156/583.1; 198/404; 100/93 P; 100/193

[58] Field of Search ..................... 156/258, 304.5, 379.6, 156/379.8, 379.9, 380.2, 380.4, 381, 502, 512, 543, 544, 546, 556, 558, 567, 580, 583.1; 198/404; 100/93 P, 193

[56] References Cited

U.S. PATENT DOCUMENTS

| | | | |
|---|---|---|---|
| 2,344,488 | 3/1944 | Bowling | 156/304.5 |
| 2,836,281 | 5/1958 | Lookson | 198/404 |
| 3,771,438 | 11/1973 | Radakovich | 100/193 |
| 3,943,025 | 3/1976 | Russell | 156/380.6 |
| 3,985,169 | 10/1976 | Chow | 156/304.5 |

*Primary Examiner*—Edward Kimlin
*Assistant Examiner*—Merrell C. Cashion, Jr.
*Attorney, Agent, or Firm*—Glaser, Griggs & Schwartz

[57] ABSTRACT

Apparatus for producing finger jointed lumber from random length boards is disclosed. Adhesive applied to the union of two boards of lumber mated end-to-end in a finger joint union is cured in a rotary bonding assembly including a stator and a rotor. Mounted on the stator assembly are a plurality of electrode plates disposed at equally spaced locations around the stator opening thereby defining a plurality of curing stations. The rotor assembly is mounted for rotation within the stator assembly and includes a plurality of electrode plates disposed at equally spaced locations and in axial alignment with the stator electrode plates. The electrode plates are adapted to conduct radio frequency current through the finger joint union of boards confined between the rotor and stator electrode plates at each curing station.

2 Claims, 7 Drawing Figures

LUMBER ASSEMBLY MACHINE

BACKGROUND OF THE INVENTION

1. Field of the Invention

This invention is related to apparatus for automatically joining two boards in an end-to-end union, and in particular to apparatus for curing adhesive applied to the union of two boards of lumber mated end-to-end in a finger joint union.

2. Description of the Prior Art

Short pieces of lumber may be joined end-to-end in a finger joint union to produce a long length of lumber. The end portions of the boards are machined to form mating finger joints which are coated with an adhesive and are compressed to close the joint. The jointed lumber set is subsequently cured by compressing the glue joint with a resistance heater ram, or by passing the mated joint through an electrical field in which radio frequency current is conducted through the finger joint union for the purpose of curing the adhesive.

In the high speed, high volume continuous production process, conveyor equipment automatically mates the end finger joints of longitudinally moving boards and then applies pressure necessary for closing the joint. In this procedure, several random length sections of lumber are joined together to form a continuous board, and the glue joints are cured by advancing the jointed boards through a long curing chamber in which the glue joints are subjected to an intense radio frequency field.

A limitation to the continuous flow curing process is that pressure is applied through the union only in the axial direction. A stronger glue bond between the jointed fingers can be obtained by compressing the union axially and orthogonally, with the result that the properly cured jointed union can withstand higher bending stress concentrations, and thereby qualify for use as a higher grade of structural lumber.

Lumber assembly apparatus has been provided for producing finger jointed lumber on an intermittent basis in which the flow of lumber is halted during the curing step so that the finger joint union can be compressed axially and orthogonally while the adhesive applied to the finger joint is cured. Although the conventional "stop and go" process yields a superior finger joint, production volume of the jointed lumber is substantially reduced because of the curing time required for each joint.

OBJECTS OF THE INVENTION

It is therefore, the principal object of the present invention to provide intermittent flow lumber assembly apparatus in which the finger joint union of two boards is compressed axially and orthogonally during a glue curing step in which the rate of production approaches the rate of a continuous flow process.

It is a general object of the present invention to provide apparatus for producing an improved glue bond for two boards of lumber mated end-to-end in a finger joint union.

SUMMARY OF THE INVENTION

Finger jointed lumber is produced from prepared, random length boards in an intermittent production process. Adhesive applied to the union of two boards of lumber mated end-to-end in a finger joint union is cured in a rotary bonding assembly including a stator and a rotor. Mounted on the stator assembly are a plurality of electrode plates disposed at equally spaced locations around the stator opening thereby defining a plurality of curing stations. The rotor assembly is mounted for rotation within the stator assembly, and includes a plurality of electrode plates disposed at equally spaced locations and in axial alignment with the stator electrode plates.

The electrode plates are adapted to conduct radio frequency current through the finger joint union of mated boards confined between the rotor and stator electrode plates at each curing station. The rotor includes a drum having longitudinal slots for separately carrying mated sets of boards. A clamp assembly mounted on the drum selectively holds and releases the mated sets of boards. A drive motor is coupled to the drum for advancing the drum from station to station after each curing interval.

While the mated boards are held together under pressure, the glue joint is heated as radio frequency current is conducted through the finger joint union for a short duration, for example 10 seconds. The drum is then rotated clockwise and the glue joint is subjected to further heating by the conduction of radio frequency current through the rotor and stator electrode plates. A new board pair is loaded onto the drum at the position previously occupied by the first board pair. This procedure is continued until the first board loaded onto the drum is advanced successively through each curing station until it returns to the load station. The cured board pair is then automatically ejected from the drum onto a discharge conveyor, and the position it occupied on the load drum is then filled by a new board pair at the load station.

The novel features which characterize the invention are defined by the appended claims. The foregoing and other objects, advantages and features of the invention will hereinafter appear, and for purposes for illustration of the invention, but not the limitation, an exemplary embodiment of the invention is shown in the appended drawings.

DETAILED DESCRIPTION OF THE PREFERRED EMBODIMENTS

Figure 1:
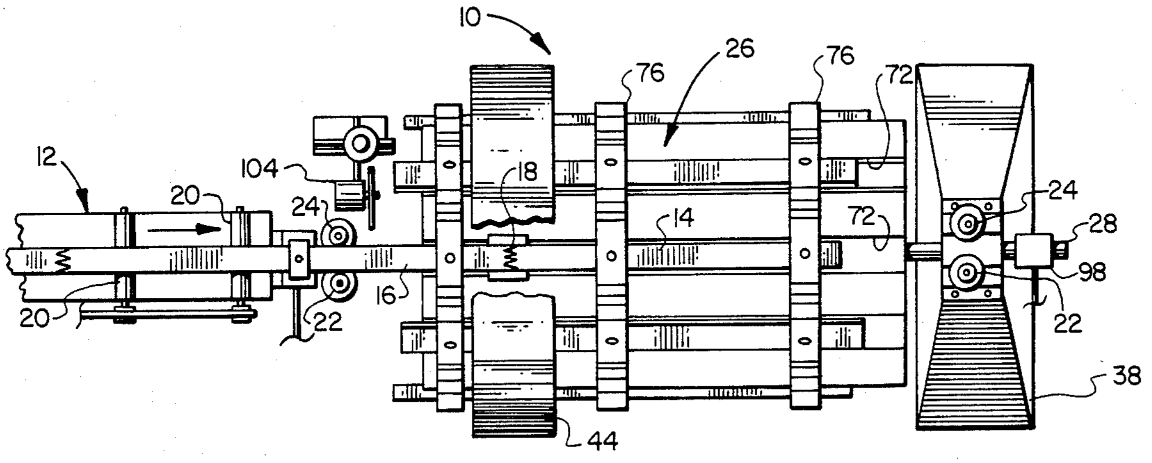
FIG. 1 is a top plan view, partly broken away, of a lumber assembly machine constructed according to the teachings of the present invention.

In the description which follows, like parts are marked throughout the specification and drawings with the same reference numerals, respectively. The drawings are not necessarily to scale and in some instances proportions have been exaggerated in order to more clearly depict certain features of the invention.

Figure 2:
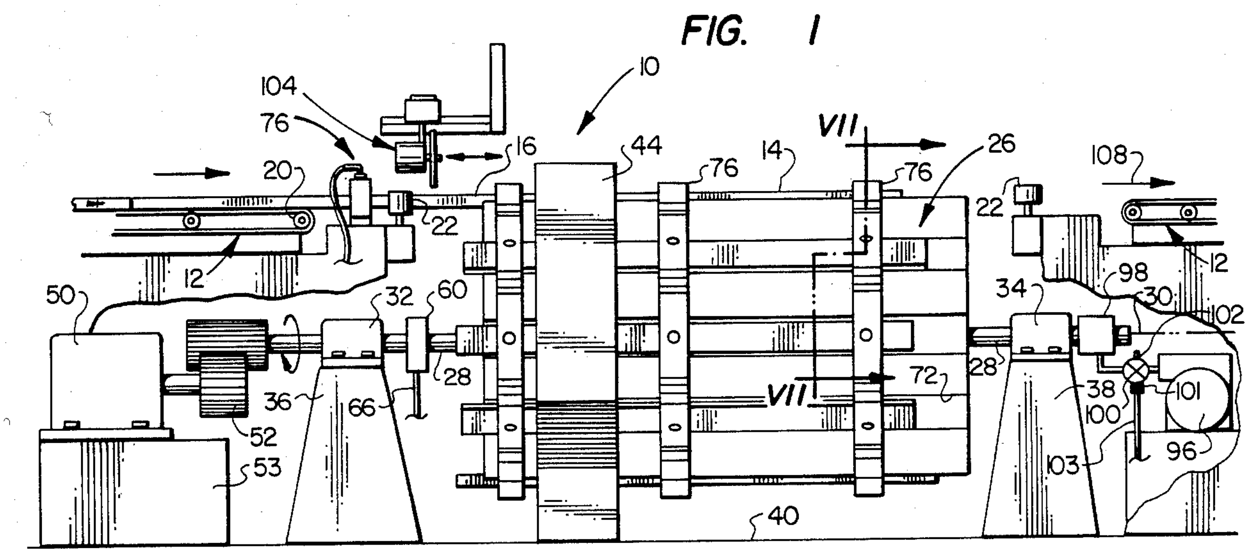
FIG. 2 is a front elevation view thereof, partly broken away.

Referring now to the drawings, and in particular to FIGS. 1 and 2 thereof, a lumber assembly machine 10 is shown integrated into the production line of a lumber assembly plant. The production line is served by a conveyor assembly 12. Boards 14, 16, nominally 2×4 inches and having a random length, are joined on opposing ends in a finger joint union 18.

The abutting ends of the boards 14, 16 are machined to define the complimentary mating finger joints prior to delivery to the lumber assembly machine 10. Adhesive is applied to the finger joints, and after the finger joints are interlocked, the boards 14, 16 are compressed axially to close the union. The mated pair of boards 14, 16 are delivered to the lumber assembly machine 10 by drive rollers 20 and by power rollers 22, 24. The power rollers 22, 24 are yieldably biased for engagement with the edge of the board 16 to allow the boards to pass into the lumber assembly machine without binding, while assuring positive frictional engagement by the power rollers.

The lumber assembly machine 10 is provided with a cylindrical drum 26 onto which the mated board pairs are loaded. The load drum 26 is mounted onto a support shaft 28 for turning movement about an axis 30 of rotation. The shaft 28 is journaled on opposite sides of the drum 26 in bearing assemblies 32, 34. The bearing assemblies 32, 34 are mounted on blocks 36, 38, respectively which support the drum 26 at an elevated position with respect to the floor 40 of the production facility.

Figure 3:
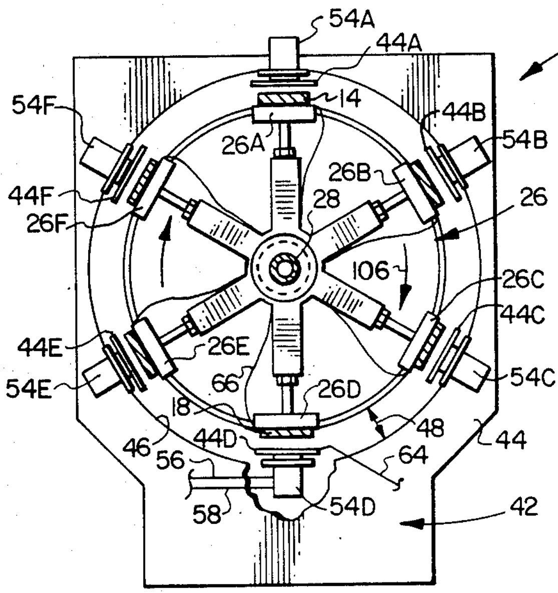
FIG. 3 is a side elevation view thereof, partly in section, which illustrates retraction of the stator electrode plates.

Referring now to FIGS. 2 and 3, concentrically disposed about the load drum 26 is a stator assembly 42. The stator assembly 42 includes a housing 44 through which a cylindrical opening 46 is formed. According to this arrangement, a portion of the load drum 26 projects completely through the stator opening 46, with the load drum 26 and stator housing 44 being separated by radial air gap 48. According to this arrangement, the load drum 26 can turn freely without interference or binding engagement with the stator 42.

Turning movement of the rotor drum 26 is provided by a drive motor 50. Torque is transmitted through the shaft 28 by a pinion gear assembly 52. Drive motor control means 53 including a timer circuit is electrically coupled to the motor 50 to cause the drum 26 to rotate through a predetermined number of degrees after each curing cycle.

Figure 4:
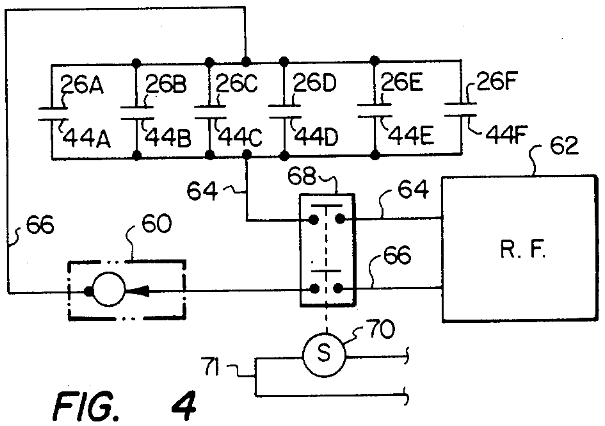
FIG. 4 is a schematic wiring diagram which illustrates the method by which radio frequency current is applied to the rotor and stator electrode plates.

The adhesive applied to the finger joint union 18 is cured by conducting electrical current at radio frequency through the finger joint union. Referring to FIGS. 3 and 4, the R.F. current is conducted through electrode plates carried by the rotor drum 26 and by the stator 44. The stator plates 44A, 44B, 44C, 44D, 44E and 44F are equally spaced about the inside diameter of the stator opening 46 and are tangentially oriented with respect to the rotor drum 26 for engaging a corresponding number of rotor electrode plates 26A, 26B, 26C, 26D, 26E and 26F.

Figure 5:
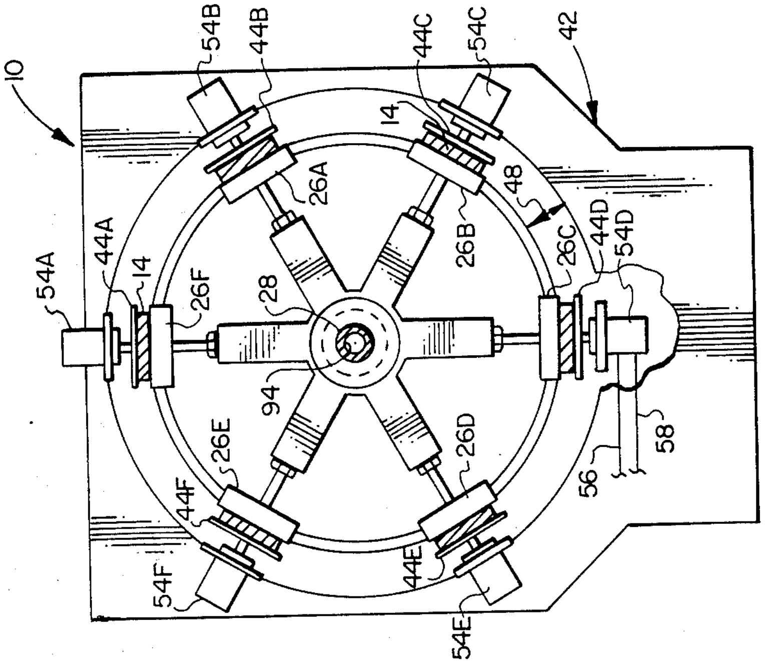
FIG. 5 is a side elevation view similar to FIG. 3 which illustrates extension of the stator electrode plates.

As can be seen in FIGS. 3 and 5, the rotor electrode plates 26A-26F are in radial alignment with the stator electrode plates 44A-44F. According to this arrangement, the finger joint union 18 of mated board pairs can be compressed in an orthogonal direction as curing of the adhesive is taking place. The compressive orthogonal force is directed onto the finger joint union 18 by an extensible ram 54 which is mechanically coupled to each stator electrode plates as can best be seen in FIG. 3. The ram 54 is extended during a curing cycle in response to an extend signal 56.

During the application of the extend signal 56, the ram 54 drives the stator electrode plates into compressive engagement with the finger joint union of the mated boards as illustrated in FIG. 5. The duration of the extend signal is typically 10 seconds after which the ram 54 is retracted in response to a retract signal 58, with the result that the stator electrode plates are retracted away from the finger jont union as illustrated in FIG. 3. After this operation, the drum is incrementally advanced by the motor controller 53 through a predetermined number of degrees to position the finger joint unions of the mated boards pairs loaded onto the drum between the next set of stator and rotor electrodes.

Referring now to FIGS. 2, 3 and 4, the rotor electrodes 26A-26F are energized with radio frequency electrical current through a slip ring assembly 60. Radio frequency current is conducted by an R.F. generator 62 through power conductors 64, 66. The flow of R.F. current through the power conductor 64, 66 is interrupted by a power contactor 68 during a turning interval as the rotor advances to the next curing station, with R.F. power being conducted through the contactor assembly 68 during a curing cycle. Operation of the power contactor 68 is controlled and coordinated with the curing and turning intervals by a solenoid 70, which closes the contractor 68 in response to a cure signal 71 received from the controller 53.

Figure 6:
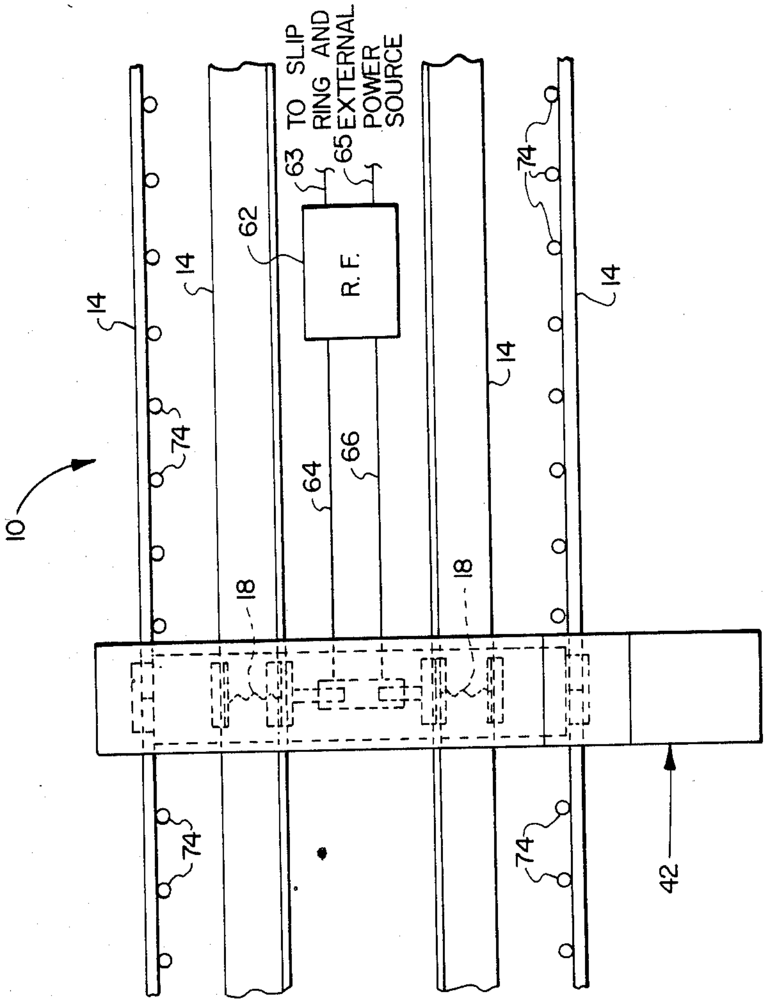
FIG. 6 is a front elevation view of a portion of the rotor and stator assemblies; and, FIG. 7 is a sectional view of a portion of the drum rotor assembly as viewed along lines VII—VII of FIG. 2.

An alternative R.F. generator arrangement is illustrated in FIG. 6. In this arrangement, the R.F. generator 62 is mounted inside of the load drum assembly 26, and electrical power is conducted to it from an external power source through the slip ring 60 by power conductors 63, 65.

Figure 7:
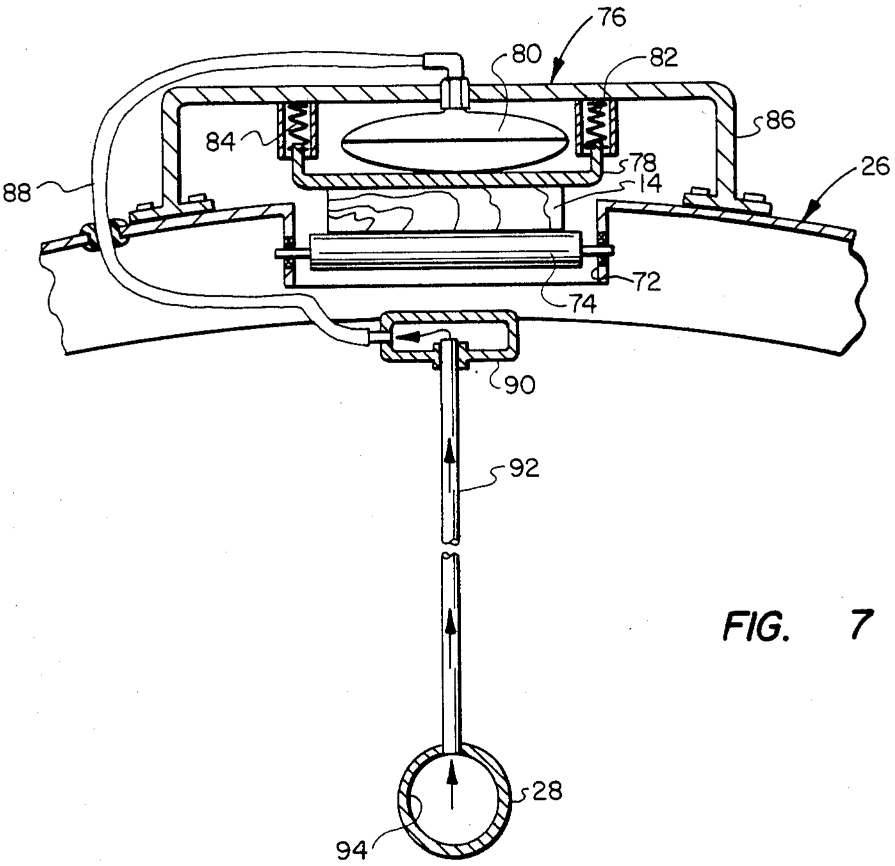

Referring now to FIGS. 2, 6 and 7, slots 72 are formed in the external surface and along the length of the drum 26. Roller bars 74 are mounted across the slots 72 for supporting the assembled board pair 14, 16. The assembled board pair 14, 16 is confined against the roller bars 74 within the slot 72 by a hold down assembly 76. The hold down assembly 76 includes a movable hold-down plate 78 which is mechanically coupled to a high pressure air bladder 80. The hold-down plate 78 is resiliently biased for movement away from the board 14 by springs 82, 84 which are coupled to a stand-off bar 86. The stand-off bar 86 is mounted onto the external surface of the load drum 26 and reacts the force developed by the bladder 80 as it drives the hold-down plate into compressive engagement with the board 14.

Referring now to FIGS. 2 and 7, the bladder 80 is pressurized and vented through a distribution conduit 88. The distribution conduit 88 supplies pressurized air to a distribution plenum 90 which is charged and vented through a distribution conduit 92. According to this arrangement the support shaft 28 is provided with a bore 94 through which pressurized air is conveyed from a high pressure reservoir 96. High pressure air from the reservoir 96 is conducted into the bore 94 of the support shaft 28 through a rotary fluid coupling 98.

Two way valve 100 charges the plenum 90 with high pressure air during each curing cycle and during rotation of the drum 26, and vents the high pressure air from the supply plenum 90 to allow the bladder 80 to retract and thereby provide clearance for movement of the jointed board pair through the slot 72 off of the drum 26 and onto the exit conveyor 12. Operation of valve 100 is controlled by a solenoid 101 which is energized by controller 53 through control line 103.

Operation of the lumber assembly machine 10 is as follows: a pair of boards 14, 16 are pre-assembled and mated end-to-end in a finger joint union 18 to which an adhesive has been applied. The finger joint union is compressed axially to close the union before the board pair reaches the curing station. Thereafter, it is transported along with the conveyor assembly 12 and is loaded into the slot 72 of the load drum 26. The finger joint union 18 is axially aligned between the rotor and stator electrode plates 26A, 44A respectively. Alignment of the finger joint union 18 is maintained by the hold-down assembly 76 which firmly locks the board 14 onto the drum 26.

While the boards are being compressed axially, the ram 54 coupled to the stator plate 44A is extended into the air gap 48, thereby driving the electrode plate 44A into compressive engagement with the finger joint union 18. Upon extension of the ram 54, solenoid 70 is actuated, thereby causing radio frequency current to be conducted through power conductors 64, 66 to the rotor and stator electrodes 26A–26F and 44A–44F, respectively. The curing interval is controlled by the timer circuit in the controller 53 for a duration of 10 seconds.

After the end of the first curing cycle, and while the mated board pair 14, 16 is held securely onto the drum 26, the board 16 is cut by a movable power saw 104 to produce a board having a predetermined length, for example twelve feet. The load drum is then rotated clockwise as indicated by the arrow 106 in FIG. 3 until the finger joint union cured at station A is brought into radial alignment with the stator electrode plate 44B at station B. When the previously cured finger joint union has reached station B, a new board pair is inserted into the empty slot 72 at station A, with its finger joint union 18 being axially aligned with the rotor and stator electrodes. The rams 54A–54F are then extended to drive the stator electrodes into compressive engagement with the finger joint union of board pairs loaded into the drum slots. In this new rotor position, the finger joint unions 18 are subjected to further heating by the conduction of high energy radio frequency current through the rotor and stator electrodes.

This process is continued from curing station A through curing station F. The board pair occupying curing staton F is advanced to curing station A, whereupon the hold down assembly 76 is released, and the completely cured jointed board pair 14, 16 is ejected onto the exit conveyor 12 in the direction indicated by the arrow 108. A new board pair is loaded onto the drum 26 into the empty slot 72 at station A, and the curing cycle is repeated.

According to this method, the lumber assembly machine 10 produces a completely cured, finger jointed board pair each 10 seconds, yielding approximately 360 jointed boards per hour. Moreover, the initial curing step is performed in Station A while compression forces are applied across the finger joint union both axially and orthogonally. In each succeeding Station, the partially cured finger joint union 18 is subjected to further orthogonal loading as R.F. curing is being carried out.

Although the invention has been described with reference to a specific embodiment, this description should not be construed in a limiting sense. Various modifications of the disclosed embodiment as well as alternative embodiments of the invention will become apparent to persons skilled in the art upon reference to the description. It is therefore comtemplated that the appended claims will cover any such modifications or embodiments which fall within the true scope of the invention.

What is claimed is:

1. Apparatus for curing adhesive applied to the union of two boards of lumber mated end-to-end in a finger joint union comprising, in combination:

a stator assembly having an opening for receiving a rotor, said stator also having a plurality of electrode plates disposed at spaced locations around said opening thereby defining a plurality of curing stations;

a rotor assembly having a plurality of electrode plates disposed at angularly spaced locations within said stator opening in axial alignment with said stator electrode plates, the number and spacing of said rotor electrode plates corresponding with the nunber and spacing of said stator electrode plates; means for moving the plurality of stator electrode plates into compressive engagement with the finger joint union of two boards disposed intermediate said rotor stator electrode plates at each curing station when said rotor electrode plates are in radial alignment with said stator electrode plates, all of said rotor and stator electrode plates being adapted to conduct electrical current through said finger joint union.

2. Apparatus for curing adhesive applied to the union of two boards of lumber mated end-to-end in a finger joint union comprising, in combination:

a drum mounted for movement about an axis of rotation, a drive motor coupled to said drum for rotating said drum about the axis of rotation;

a clamp assembly mounted on said drum for selectively holding and releasing a board of lumber; and, a bonding assembly including a stator unit and a rotor unit, said stator unit having an opening in which said drum is received, and said rotor unit being mounted on said drum, said rotor unit including a plurality of electrode plates disposed at angularly spaced stations on said drum and said stator unit having a plurality of electrode plates disposed at a corresponding number of angularly spaced stations on said stator; means for moving the plurality of stator electrode plates into compressive engagement with the finger joint union of two boards disposed intermediate said rotor and stator electrode plates at each curing station when said rotor electrode plates are in radial alignment with all of said rotor and stator electrode plates being adapted to conduct electrical current through said finger joint union.

* * * * *